United States Patent [19]
Suzuki

[11] Patent Number: 5,517,318
[45] Date of Patent: May 14, 1996

[54] IMAGE FORMING APPARATUS

[75] Inventor: Kenji Suzuki, Saitama, Japan

[73] Assignee: Fuji Xerox Co., Ltd., Tokyo, Japan

[21] Appl. No.: 961,330

[22] Filed: Oct. 15, 1992

[30]     Foreign Application Priority Data

Oct. 16, 1991 [JP] Japan .................................. 3-294909

[51] Int. Cl.$^6$ ...................................................... H04N 1/21
[52] U.S. Cl. ............................................ 358/298; 347/254
[58] Field of Search ........................... 358/298, 474–490,
358/494, 497, 296, 298, 300, 302; 346/160, 108

[56]                References Cited

U.S. PATENT DOCUMENTS

| | | | |
|---|---|---|---|
| 5,123,082 | 6/1992 | Shimada | 395/102 |
| 5,194,879 | 3/1993 | Kotabe et al. | 358/298 |
| 5,241,329 | 8/1993 | Guerin | 358/298 |

FOREIGN PATENT DOCUMENTS

2-206566  8/1990  Japan .

*Primary Examiner*—Bernard Roskoski
*Attorney, Agent, or Firm*—Finnegan, Henderson, Farabow, Garrett & Dunner

[57]                ABSTRACT

Although three resolutions of 600 SPI, 300 SPI and 150 SPI are available, a host apparatus 1 applies data D to line buffers 3 and 4 at a video rate determined by the resolution of 600 SPI. The data stored in the line buffers 3 and 4 are read with clock signals outputted by data writing and reading control sections 5 and 6, and are applied through a multiplexer 7 to a laser beam source 8 in a printer. In the case where the resolution specified is 300 SPI, the control sections 5 and 6 read the data with a clock signal whose period is twice as long as that which is employed in the case where the resolution is 600 SPI; and in the case where the resolution specified is 150 SPI, they read the data with a clock signal whose period is four times as long. Furthermore, in the case where the resolution is 300 SPI, one and the same data is read as much as two lines in succession; and in the case where the resolution is 150 SPI, one and the same data is read as much as four lines in succession.

4 Claims, 7 Drawing Sheets

600SPI

FIG. 5(b)

300SPI

FIG. 5(c)

150SPI

IMAGE FORMING APPARATUS

BACKGROUND OF THE INVENTION

1. Field of the Invention

The present invention relates generally to an image forming apparatus having resolution varying systems for recording apparatus, and more particularly to an image forming apparatus having a resolution varying system for a printer with which an image high in picture quality can be printed with any selected one of the available resolutions.

2. Related Art

One example of a conventional printer resolution switching system of the image forming apparatus has been disclosed in Unexamined Japanese Patent Application (OPI) No. Hei. 2-206566 (the term "OPI" as used herein means an "unexamined published application").

The system comprises means for switching a plurality of video clock signals different in period according to a resolution switching signal, and means for selecting a signal which is obtained by frequency-dividing a printing start signal by an integer ratio or a divisor ratio of the least common multiple according to the resolution switching signal. With the system, a resolution in the main scanning direction is changed by selecting one of the periods of the plurality of video clock signals, while a resolution in the sub-scanning direction is changed by selecting a signal which is obtained by frequency-dividing the printing start signal by an integer ratio or a divisor ratio of the least common multiple.

With the system, in response to a printing magnification specified by the host apparatus, the resolution can be switched merely by selecting a frequency division signal obtained by frequency-dividing the printing start signal with the speed of rotation of the rotary polygon mirror maintained unchanged. Hence, an operation of switching a resolution to another which is an integer multiple or non-integer multiple of the former can be achieved at high speed.

However, the above-described conventional system suffers from a problem that, when the resolution is lowered, the printed image is much lower in picture quality in the sub-scanning direction.

SUMMARY OF THE INVENTION

An object of this invention is to eliminate the above-described difficulty accompanying the conventional printer resolution switching system. Accordingly, an object of the invention is to provide an image forming apparatus having a resolution varying system for a printer with which the resolution can be changed quickly, and even when the resolution is lowered, an image high in picture quality can be printed.

The foregoing object of the invention has been achieved by a provision of an image forming apparatus including a resolution varying system in a printer which performs a printing operation according to a resolution changing instruction from a host apparatus adapted to output video data; in which, according to the invention, the host apparatus, irrespective of available resolutions, outputs the video data at a video rate determined by the highest of the available resolutions, the video data is stored in line buffer means, and then read therefrom at a video rate which is obtained by multiplying the video rate determined by the highest resolution by the reciprocal number of a ratio R of the highest resolution to a selected resolution", and one and the same video data for one line is read R times.

With the system of the invention, each dot of the image printed with a selected resolution is a square which is made up of a plurality of dots formed with the highest of the available resolutions in such a manner that one and the same number of dots are arranged both in the main scanning direction and in the sub-scanning direction. Therefore, an image formed with those dots is much higher in picture quality than the one formed according to the conventional system.

DESCRIPTION OF THE PREFERRED EMBODIMENTS

The present invention will now be described with reference to the accompanying drawings in detail.

Figure 1:
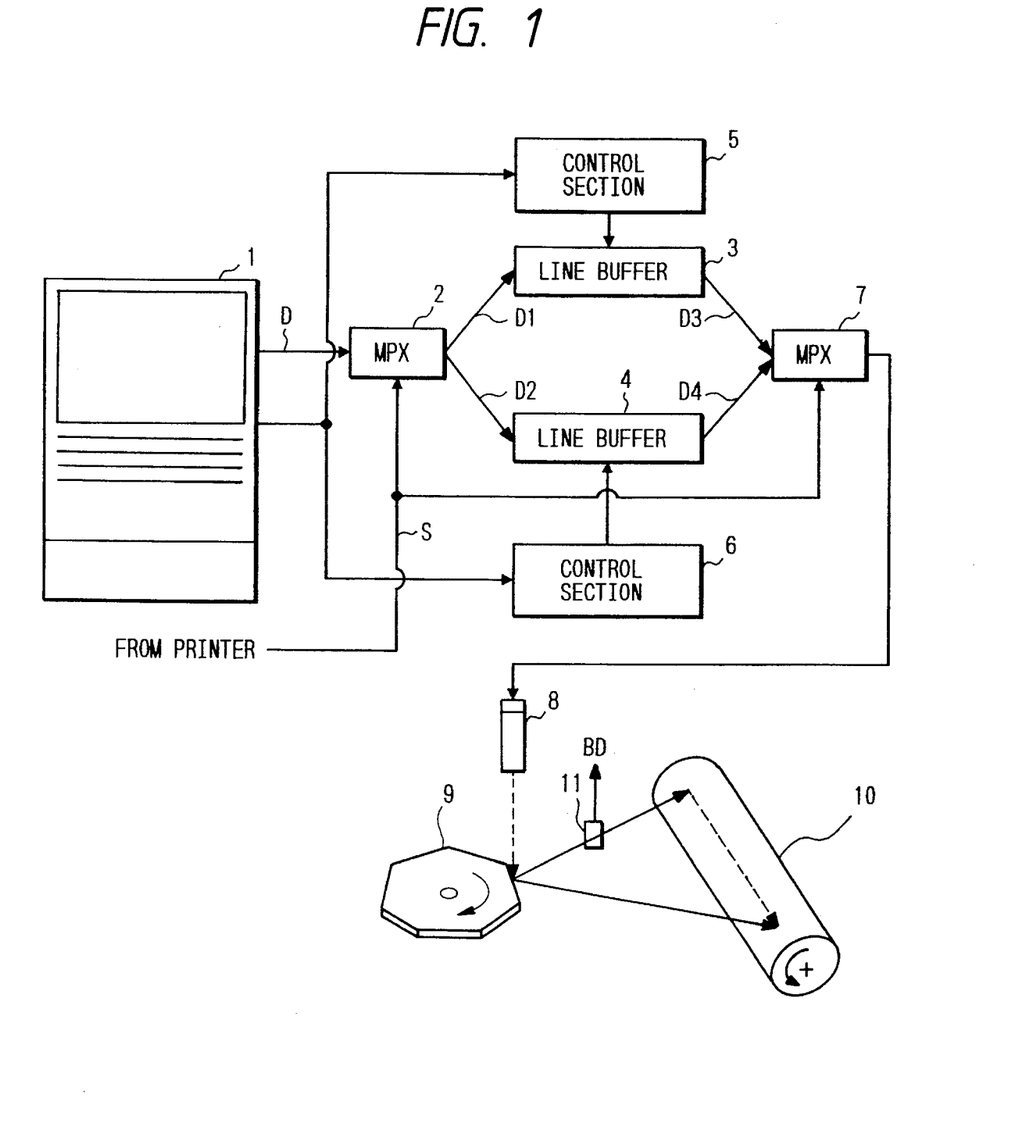
FIG. 1 is an explanatory diagram outlining the arrangement of one embodiment of this invention.

FIG. 1 is a diagram outlining the arrangement of one embodiment of the invention. In FIG. 1, reference numeral 1 designates a host apparatus for forming video data; 2 and 7, multiplexers (MPX); 3 and 4, line buffers each being capable of storing video data as much as one line, and 5 and 6, control sections for controlling the timing of writing data in and reading data from the respective line buffers.

Further in FIG. 1, reference numeral 8 designates a laser beam source for outputting a laser beam which is modulated with the data outputted by the multiplexer 7; 9, a rotary polygon mirror; 10, a photo-sensitive drum; and 11, a laser beam detector for detecting the laser beam to output a signal (BD) indicating scanning start timing.

A printer provides a line synchronizing signal S in correspondence to a given resolution. In response to the line synchronizing signal S, the multiplexers 2 and 7 select the line buffers 3 and 4 as follows: That is, when the multiplexer 2 selects the line buffer 3, the multiplexer 7 selects the line buffer 4; and in contrast when the multiplexer 2 selects the line buffer 4, the multiplexer 7 selects the line buffer 3.

Figure 2:
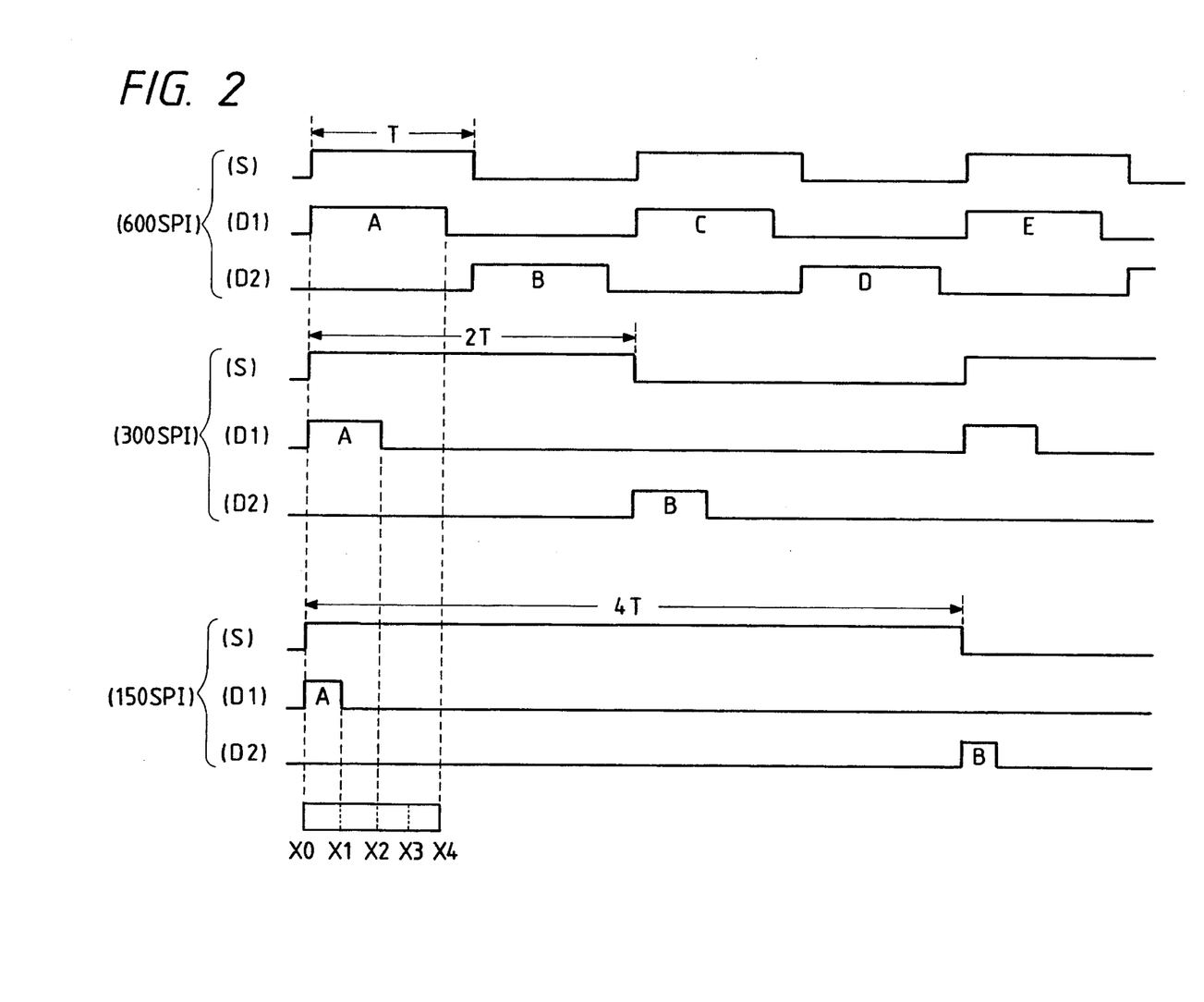
FIG. 2 is a time chart for a description of an operation in which video data outputted by a host apparatus is stored in line buffers.

Let us consider the case where the host apparatus 1 specifies resolutions 600 SPI, 300 SPI and 150 SPI, as shown in FIG. 2. In the case of the resolution of 600 SPI, the selecting operations of the multiplexers 2 and 7 are carried out every T time. In the case of the resolution of 300 SPI, the selecting operations are carried out every 2T time. In the case of the resolution of 150 SPI, the selecting operations are carried out every 4T time. That is, the selecting operations of the multiplexers are performed with a period corresponding to a given resolution.

On the other hand, the host apparatus 1 provides video data D. The video data D is transferred at a video rate determined by the highest of the given resolutions; that is, in the embodiment, the video data is transferred at the video rate determined by the resolution of 600 SPI.

Hence, with the resolution of 600 SPI, the timing of video data D1 and D2 stored in the line buffers 3 and 4 occurs every T time as shown in FIG. 2. In FIG. 2, reference characters A, B, C, D, E, . . . designate data for lines of the above-described video data D, respectively.

In the case where the resolution is 300 SPI, the amount of data D in the scanning direction outputted by the host apparatus is a half (½) of that which is provided in the case where the resolution is 600 SPI. Therefore, as shown in FIG. 2, the timing of video data D1 and D2 stored in the line buffers 3 and 4 occurs every 2T time, and the video data D1 and D1 are each half of those provided in the case where the resolution is 600 SPI. In this connection, it is assumed that, in the line buffer 3, a train of bits in the direction of line is divided into four equal parts, which are segregated from one another by dividing lines X0, X1, X2, X3 and X4, as shown in FIG. 2. Of the video data D1, a part A for one line is stored between the dividing lines X0 and X2, and no data is stored between the dividing lines X2 and X4.

In the case where the resolution is 150 SPI, the amount of data D in the scanning direction outputted by the host apparatus is a quarter (¼) of that which is provided in the case where the resolution is 600 SPI. Therefore, as shown in FIG. 2, the timing of video data D1 and D2 stored in the line buffers 3 and 4 occurs every 4T time, and the video data D1 and D1 are ¼ of those provided in the case where the resolution is 600 SPI. Of the video data D1, a part A for one line is stored between the dividing lines X0 and X1, and no data is stored between the dividing lines X1 and X4.

An operation of reading the video data D1 and D2 thus stored in the line buffers 3 and 4 will be described. This data reading operation is controlled by the control sections 5 and 6 shown in FIG. 1.

Figure 3:
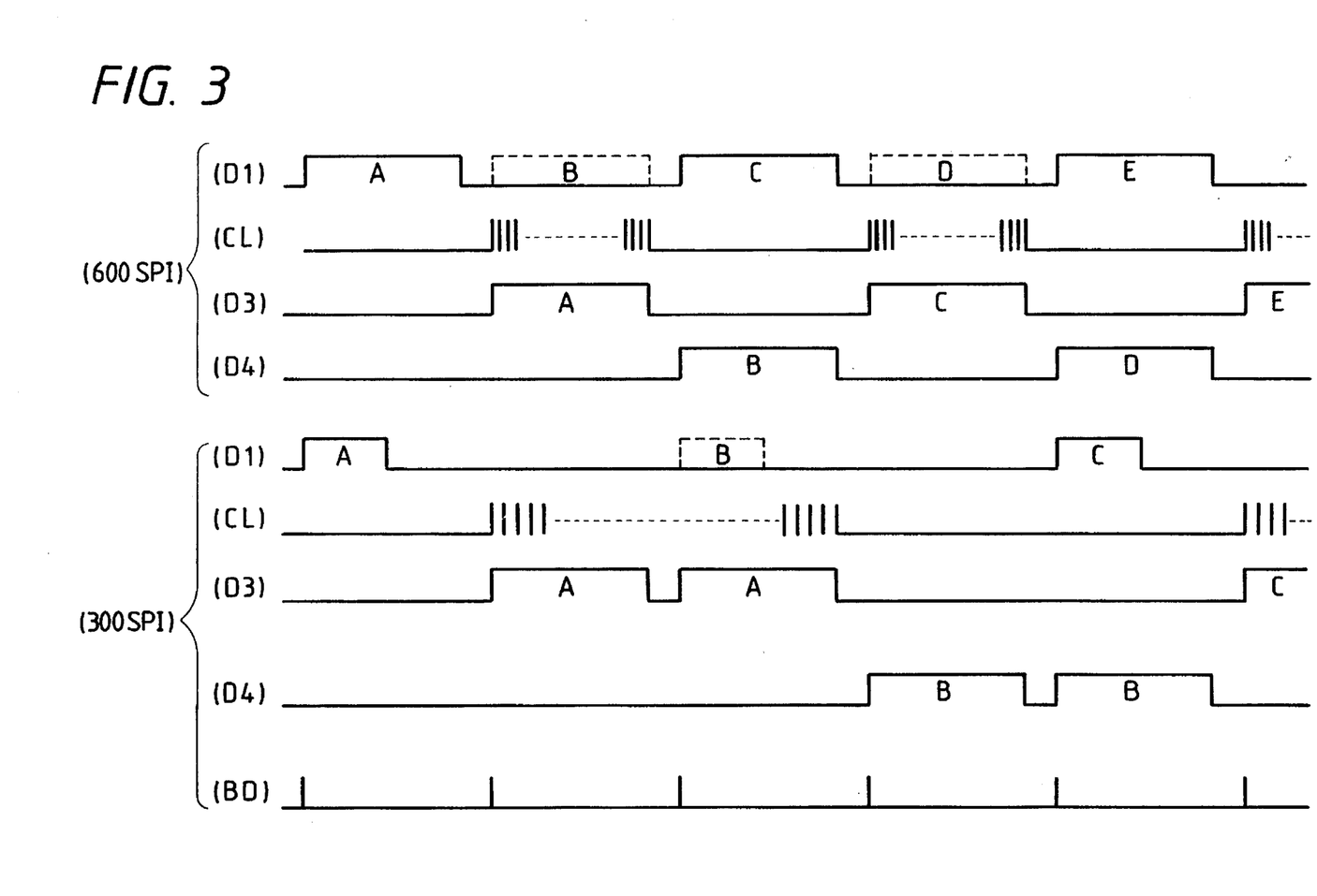
FIG. 3 is a time chart showing the timing of reading data from the line buffers in the case where the resolution is 600 SPI, and in the case where it is 300 SPI.

In the case where the resolution is 600 SPI, as shown in FIG. 3 a clock signal CL equal in period to that which is used in the data inputting operation is applied to the line buffers 3 and 4, so that, in each of the line buffers 3 and 4, the data is read starting from the dividing line X4. Hence, the data D3 read from the line buffer 3 is transferred to the multiplexer 7 with the timing which is delayed by the T time from that in the data inputting operation, and at a speed (or video rate) equal to that in the data inputting operation.

In FIG. 3, reference character BD designates the printing start signal which is outputted by the laser beam detector 11 (FIG. 1). The signal BD indicates the timing of starting the scanning of the photo-sensitive drum 10 with the laser beam.

In the case where the resolution is 300 SPI, as shown in FIG. 3 a clock signal CL whose period is twice as long as that which is employed in the data inputting operation is applied to the line buffers 3 and 4, so that, in each of the line buffers 3 and 4, data are read starting from the dividing lines X2 and X4. In the case of the data D3 read from the line buffer 3, it is read with the timing which is delayed by the T time from that in the data inputting operation, and at a speed which is a half (½) of that in the data inputting operation. And the same data is applied to the multiplexer 7 twice in succession.

Figure 4:
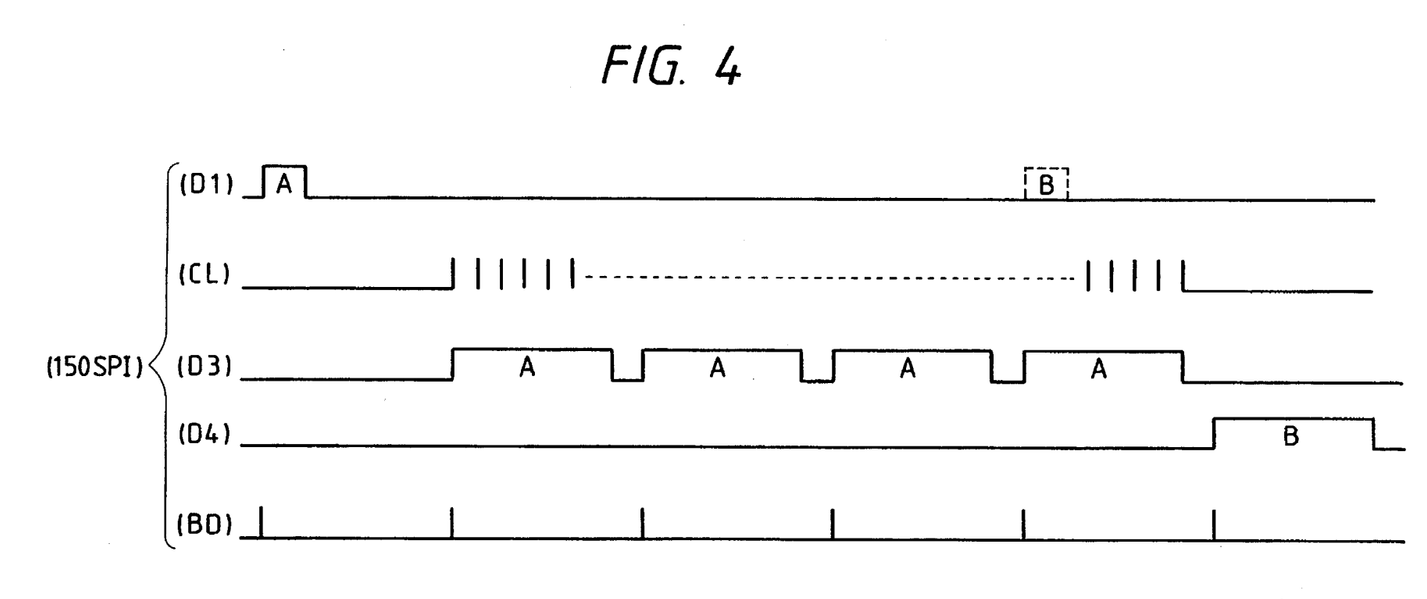
FIG. 4 is a time chart showing the timing of reading data from the line buffers in the case where the resolution is 600 SPI.

In the case where the resolution is 150 SPI, as shown in FIG. 4 a clock signal CL whose period is four times as long as that which is employed in the data inputting operation is applied to the line buffers 3 and 4, so that, in each of the line buffers 3 and 4, data are read starting from the dividing lines X1, X2, X3 and X4. In the case of the data D3 read from the line buffer 3, it is read with the timing which is delayed by the T time from that in the data inputting operation, and at a speed which is a quarter (¼) of that in the data inputting operation. And the same data is applied to the multiplexer 7 four times in succession.

The data reading timing relates to the above-described printing start signal BD as shown in FIG. 4. With reference to FIGS. 3 and 4, mainly the operations of reading data from the line buffer 3 have been described. However, it should be noted that operations of reading data from the line buffer 4 are performed in the same manner, as indicated at D4 in FIGS. 3 and 4.

The data D3 and D4 outputted by the multiplexer 7 are applied to the laser beam source 8, to modulate the output laser beam of the latter 8. The laser beam thus modulated, being reflected by the rotary polygon mirror 9, is applied to the photo-sensitive drum 10.

As a result, the data are provided as a latent image on the photo-sensitive drum 10. The latent image is developed by a conventional image developing technique using toner, and transferred onto a printing sheet (not shown), and then fixed. That is, the image is printed on the printing sheet.

Figure 5A:
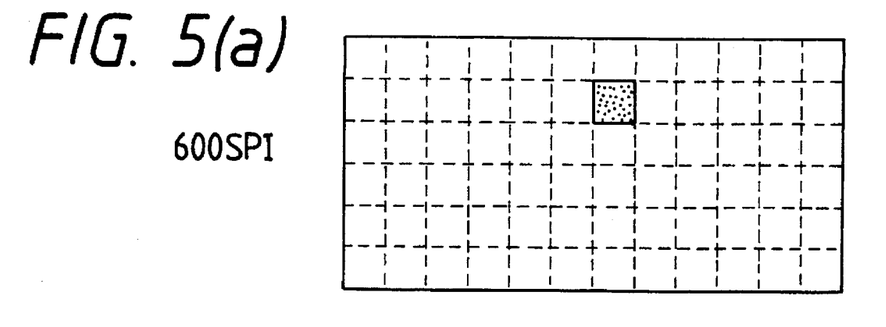
FIG. 5 is a diagram showing the structures of dots which are printed according to the invention.
Figure 5B:
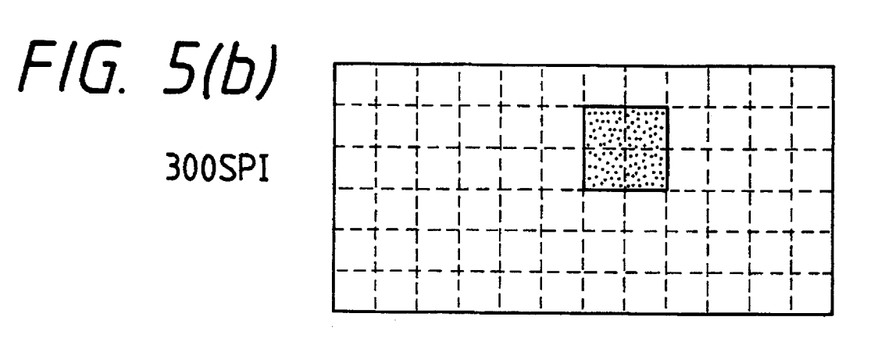
Figure 5C:
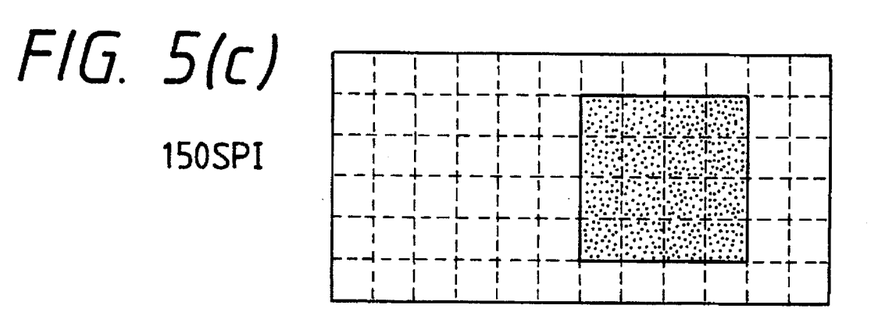

FIG. 5 shows one dot representing black data which is printed with the system of the invention. More specifically, the part (a) of FIG. 5 shows one dot printed with a resolution of 600 SPI; the part (b), one dot printed with a resolution of 300 SPI; and the part (c), one dot printed with a resolution of 150 SPI.

As is apparent from comparison of the parts (a), (b) and (c) of FIG. 5 with one another, one dot with a resolution of 300 SPI is a square which is made up of four dots formed with a resolution of 600 SPI in such a manner that the same number of dots, two dots in this case, are arranged both in the main scanning direction and in the sub-scanning direction; and one dot with a resolution of 150 SPI is also a square which is made up of sixteen dots formed with a resolution of 600 SPI in such a manner that four dots are arranged both in the main scanning direction and in the sub-scanning direction.

Hence, even when, in the printer, the resolution is lowered, each dot printed with the resultant resolution is a square made up of dots printed with a resolution of 600 SPI in such a manner that the same number of dots are arranged both in the main scanning direction and in the sub-scanning direction. Therefore, the resultant print made up of those dots is high in picture quality. According to the embodiment, a plurality of dots formed with a resolution of 600 SPI are arranged also in the sub-scanning direction, and therefore the picture quality is greatly improved in the sub-scanning direction.

The data writing and reading control sections 5 and 6 will be described with reference to FIG. 6 in more detail. Since those control sections 5 and 6 are equal in arrangement, the control section 5 will be described as their typical example.

First, an operation of writing video data in the line buffer 3 will be described.

The host apparatus 1 applies a write instruction signal W and a video clock signal for a resolution of 600 SPI are applied to an AND circuit 21. On the other hand, data D having a video rate determined by the resolution of 600 SPI is applied through the multiplexer 2 to the line buffer 3. In this case, the period of time for which the write instruction signal is held at "H (high)" level depends on whether the resolution is 600 SPI or 300 SPI or 150 SPI. If it is assumed that the period of time is represented by $T_0$ in the case where the resolution is 600 SPI, then in the case where the resolution is 300 SPI, the period of time is $T_0/2$; and in the case where the resolution is 150 SPI, it is $T_0/4$.

For the above-described period of time, the video clock signal for a resolution of 600 SPI is applied through the AND circuit 21 to an OR circuit 22, the output of which is applied to the line buffer 3. As a result, as shown in FIG. 2, in the case where the resolution is 600 SPI, the video data D1 is stored between the dividing lines X0 and X4 in the line buffer 3; in the case where the resolution is 300 SPI, the video data D1 is stored between the dividing lines X0 and X2 in the line buffer 3; and in the case where the resolution is 150 SPI, the video data D1 is stored between the dividing lines X0 and X1 in the line buffer 3.

Now, an operation of reading data from the line buffer 3 will be described.

In this operation, a read instruction signal R (R1, R2 or R3) corresponding to a given resolution is applied to a video clock selecting circuit 23. ReSolutions of 600 SPI, 300 SPI and 150 SPI are specified for the video clock selecting circuit 23.

When a resolution of 600 SPI is specified for the video clock selecting circuit 23, the latter 23 applies the video clock signal for a resolution of 600 SPI to the OR circuit 22 for a period of time for which the read instruction signal R1 is at "H" level. When the resolution of 300 SPI is specified, the video clock selecting circuit 23 subjects the video clock signal for a resolution of 600 SPI to ½ frequency division, and applies the resultant signal to the OR circuit 22 for a period of time for which the read instruction signal R2 is at "H" level. When the resolution of 150 SPI is specified, the video clock selecting circuit 23 subjects the video clock signal for 600 SPI to ¼ frequency division, and applies the resultant signal to the OR circuit 22 for a period of time for which the read instruction signal R3 is at "H" level.

Therefore, the clock signals CL, which are outputted by the OR circuit 22 and applied to the line buffer 3, are as shown in FIGS. 3 and 4.

The resolution of 600 SPI is further specified for a line buffer reading control circuit 24. In this case, the latter 24 applies a signal to an output lines a4 which is raised to "H" level with the timing shown in FIG. 7. As a result, an AND circuit 28 is opened, and the data read starting from the dividing line X4 in the line buffer 3 is applied through the AND circuit 28 and an OR circuit 29 to the multiplexer 7.

Figure 6:
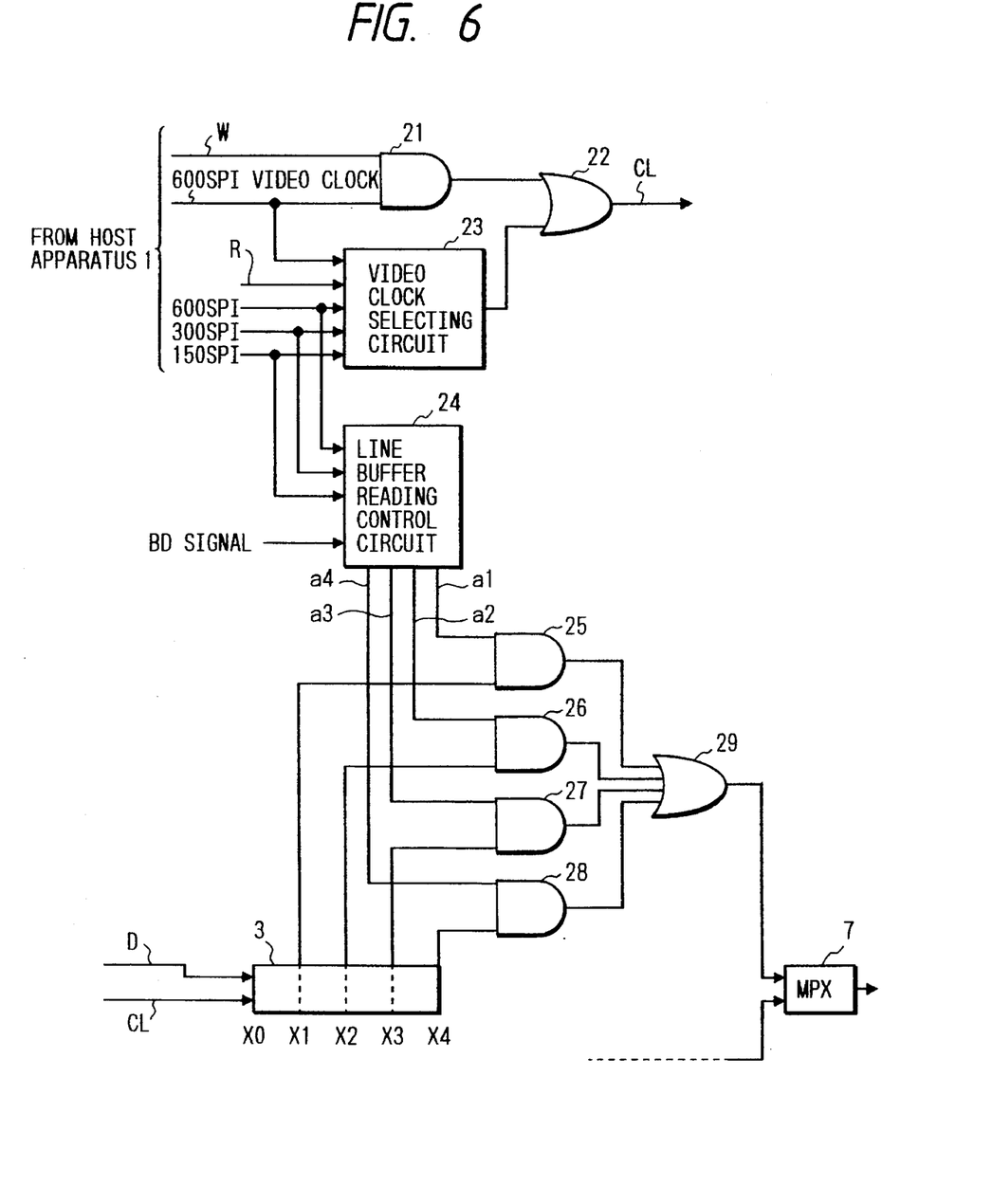
FIG. 6 is a circuit diagram, partly as a block diagram, showing the arrangement of each of the data writing and reading control sections shown in FIG. 1.
Figure 7:
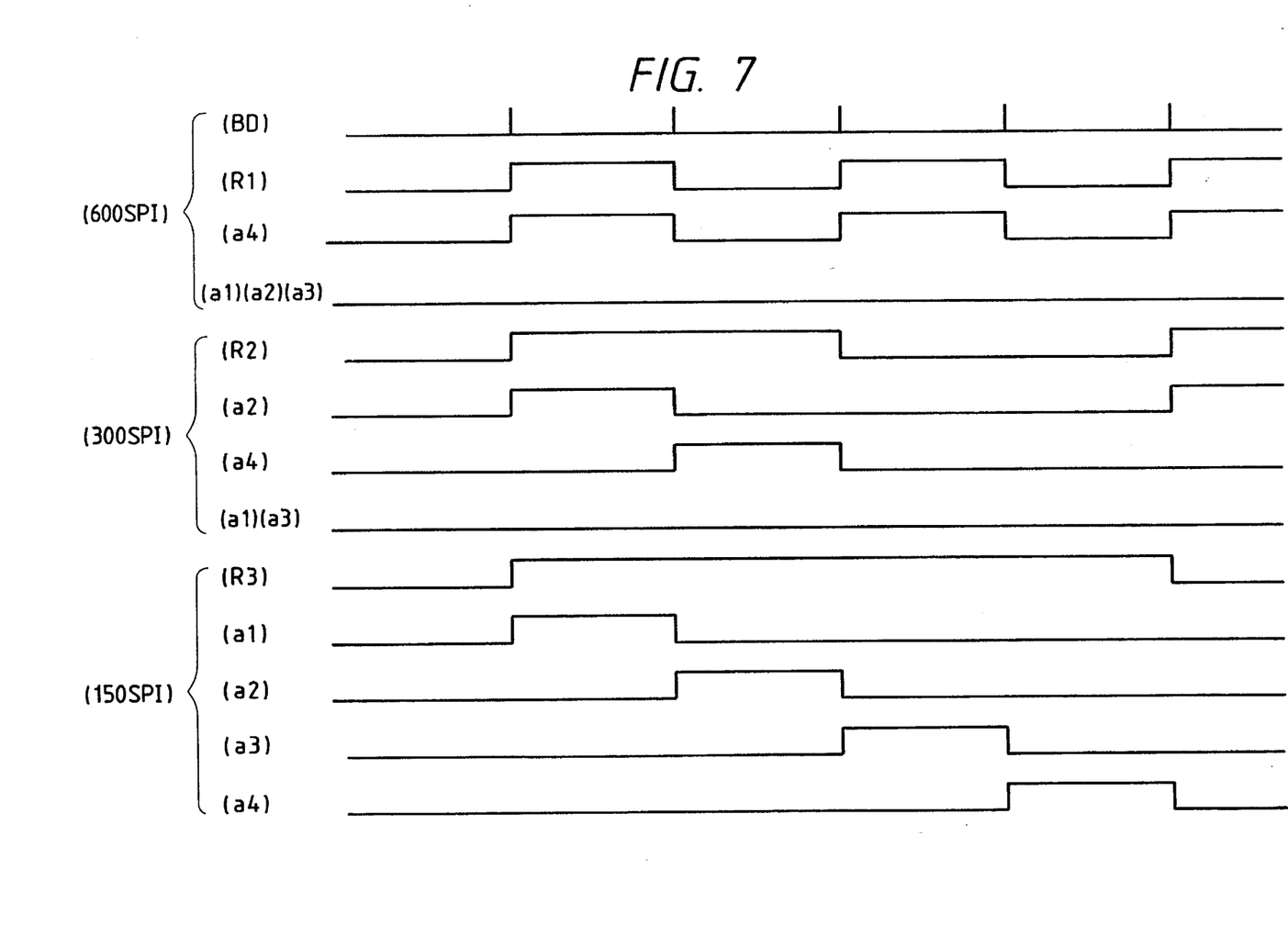
FIG. 7 is a time chart for a description of signals at essential circuit points in FIG. 6.

When the resolution of 300 SPI is specified for the line buffer reading control circuit 24, the latter 24 applies signals to output lines a2 and a4 which are raised to "H" level with the timing shown in FIG. 7. Therefore, the AND circuits 26 and 28 are opened for periods of time for which the signals on the output lines a2 and a4 are at "H" level, thus transmitting the data read starting from the dividing lines X2 and X4. The data thus transmitted are applied through the OR circuit 29 to the multiplexer 27.

When the resolution of 150 SPI is specified for the line buffer reading control circuit 24, the latter 24 applies signals to output lines a1, a2, a3 and a4 which are raised to "H" level with the timing shown in FIG. 7. Therefore, the AND circuits 25, 26, 27 and 28 are opened for periods of time for which the signals on the output lines a1, a2, a3 and a4 are at "H" level, thus transmitting the data read starting from the dividing lines X1, X2, X3 and X4. The data thus transmitted are applied through the OR circuit 29 to the multiplexer 27.

That is, with the data writing and reading control section 5 designed as shown in FIG. 6, the operation of writing data in the line buffer 3 can be performed as described with reference to FIG. 2, and the operation of reading data from the line buffer 3 can be achieved as described with reference to FIGS. 3 and 4.

As is apparent from the above description, according to the invention, even when the resolution of the printer is changed, each dot of the resultant print is a square which is made up of a plurality of dots formed with the highest resolution in such a manner that one and the same number of dots are arranged both in the main scanning direction and in the sub-direction. Therefore, a print formed with those dots is much higher in picture quality than the one formed according to the conventional system.

When it is required to change the resolution, it is unnecessary to change the speed of rotation of the rotary polygon mirror. Therefore, the resolution can be changed quickly.

What is claimed is:

1. An image forming apparatus, comprising:

means for temporarily storing lines of input image data;

means for providing information to vary the resolution of an image 1/R times a predetermined image resolution where R is an integer value equal to or greater than 1;

means for receiving a video clock signal having a predetermined video clock rate based on a clock rate corresponding to a maximum resolution of the image; and means for reading out each stored line a plurality of times, equal to R, such that each stored line is read out at a rate equal to the predetermined video clock rate and the plurality of lines are read out at a rate equal to said predetermined video clock rate divided by R.

2. The image forming apparatus of claim 1, wherein said temporary storing means comprises first and second line buffers, said first and second line buffers alternately storing lines of input image data.

3. The image forming apparatus of claim 1, further comprising a host apparatus which outputs image data of one line every time said data of one line is read R times from said temporary storing means.

4. The image forming apparatus of claim 3, wherein said host apparatus includes means for outputting image data at said predetermined video clock rate.

* * * * *